(12) United States Patent
Beust et al.

(10) Patent No.: US 8,694,925 B1
(45) Date of Patent: Apr. 8, 2014

(54) GENERATING CUSTOMIZED GRAPHICAL USER INTERFACES FOR MOBILE PROCESSING DEVICES

(75) Inventors: Cedric Beust, San Francisco, CA (US); Shumeet Baluja, Santa Clara, CA (US); Maryam Kamvar, San Francisco, CA (US); Elad Gil, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 1491 days.

(21) Appl. No.: 11/243,916

(22) Filed: Oct. 5, 2005

(51) Int. Cl.
*G06F 3/00* (2006.01)
*G06F 3/14* (2006.01)

(52) U.S. Cl.
USPC ............................ 715/866; 715/744; 715/864

(58) Field of Classification Search
USPC .......................................... 715/744, 864, 866
See application file for complete search history.

(56) References Cited

U.S. PATENT DOCUMENTS

| | | | |
|---|---|---|---|
| 6,501,956 B1 | 12/2002 | Weeren et al. | |
| 6,668,369 B1 * | 12/2003 | Krebs et al. | 717/125 |
| 6,675,204 B2 * | 1/2004 | De Boor et al. | 709/217 |
| 6,892,067 B1 * | 5/2005 | Sharma et al. | 455/419 |
| 7,051,080 B1 * | 5/2006 | Paul et al. | 709/217 |
| 2002/0099456 A1 * | 7/2002 | McLean | 700/83 |
| 2002/0165847 A1 | 11/2002 | McCartney et al. | |
| 2003/0135825 A1 | 7/2003 | Gertner et al. | |
| 2003/0182625 A1 | 9/2003 | Davidov et al. | |
| 2003/0182626 A1 | 9/2003 | Davidov et al. | |
| 2004/0012627 A1 * | 1/2004 | Zakharia et al. | 345/744 |
| 2004/0019683 A1 * | 1/2004 | Lee et al. | 709/227 |
| 2005/0034084 A1 | 2/2005 | Ohtsuki et al. | |
| 2005/0050474 A1 * | 3/2005 | Bells et al. | 715/747 |
| 2005/0139674 A1 * | 6/2005 | Ishibashi et al. | 235/454 |
| 2006/0026527 A1 * | 2/2006 | Bells | 715/747 |
| 2006/0074780 A1 * | 4/2006 | Taylor et al. | 705/35 |
| 2006/0107236 A1 * | 5/2006 | Etgen | 715/833 |
| 2006/0143297 A1 * | 6/2006 | Korhonen et al. | 709/227 |
| 2007/0066364 A1 | 3/2007 | Gil et al. | |

FOREIGN PATENT DOCUMENTS

| | | | | |
|---|---|---|---|---|
| WO | WO 99/08182 | * | 2/1999 | G06F 7/00 |
| WO | WO 2007/035732 A2 | | 3/2007 | |

OTHER PUBLICATIONS

David Eng Combining static and dynamic data in code visualization Proceedings of the 2002 ACM SIGPLAN-SIGSOFT workshop on Program analysis for software tools and engineering pp. 43-45 Published 2002.*
PCT International Search Report, PCT/US06/36482, Mar. 20, 2007, pp. 1-3.
Written Opinion of the International Searching Authority, PCT/US06/36482, Mar. 20, 2007, pp. 1-5.
PCT/US2006/036482, International Preliminary Report on Patentability, Apr. 3, 2008, pp. 1-7.

* cited by examiner

*Primary Examiner* — Andrea Long
(74) *Attorney, Agent, or Firm* — Fish & Richardson P.C.

(57) ABSTRACT

Systems and techniques for producing graphical user interfaces on handheld mobile devices include generating a markup language code defining a graphical user interface component for display on the handheld mobile device and rendering the generated markup language code to produce the graphical user interface component. In some cases, the graphical user interface component includes at least one adaptable attribute based on a selection made by a user. In other cases, a graphical user interface component is generated using static markup language code or a combination of static and dynamically generated markup language code. Graphical user interface components defined by markup language codes can be displayed in an overall graphical user interface along with components that are native to the device and/or that are defined by an application development platform.

23 Claims, 5 Drawing Sheets

GENERATING CUSTOMIZED GRAPHICAL USER INTERFACES FOR MOBILE PROCESSING DEVICES

TECHNICAL FIELD

This description relates to user interfaces, and more particularly to generating customized graphical user interfaces for mobile processing devices.

BACKGROUND

Handheld mobile devices, such as cellular telephones and personal digital assistants (PDAs), are becoming increasingly powerful both in terms of processing power and the ability to provide access to data. The usefulness of these enhancements is often limited, however, by an inability of mobile devices to display data effectively due to the small size of the display, the limited bandwidth available for wirelessly delivering data, and the limited memory resources relative to laptop and desktop computers.

There are beginning to be some applications that are specifically designed for handheld mobile devices. Many such applications are based on application development platforms also specifically designed for mobile devices, such as Java 2 Platform Micro Edition (J2ME) and Binary Runtime Environment for Wireless (BREW). Some applications that are designed for retrieving data from a remote location to a handheld mobile device are browsers that correspond to conventional browser applications in that they enable users to enter uniform resource locators (URLs) to retrieve information from any Internet web site. Other applications enable data to be retrieved by launching a separate browser application in response, for example, to selecting a hyperlink in a user interface. In addition, specialized, limited functionality applications are available that provide a mechanism to access data from dedicated application service providers.

SUMMARY

In one general aspect, a graphical user interface is produced by generating a markup language code defining a graphical user interface component for display on a handheld mobile device. The graphical user interface component including one or more adaptable attributes based on a selection made by a user. The generated markup language code is rendered to produce the graphical user interface component.

Implementations can include one or more of the following features. The selection is made through an interaction with an application running on the handheld mobile device, and the graphical user interface component is displayed on the handheld mobile device using the application. A static markup language code is retrieved from a file associated with the application. The static markup language code is rendered to produce another graphical user interface component or the static markup language code is combined with the generated markup language code to produce a combined markup language code, and the graphical user interface component is generated by rendering the combined markup language code. The article of claim 1 wherein the adaptable attributes can include a size, a color, a shape, a format, and a text. A graphical user interface component defined by an application development platform is further displayed on the handheld mobile device. The graphical user interface component is associated with a functionality of the application. A file stored on the handheld mobile device and associated with the application can store markup language code for use in generating a graphical user interface component. The markup language code is generated by a programming language code that includes instructions for generating the markup language code based on a state of at least one variable.

In another general aspect, a predefined user interface component is displayed in a graphical user interface for an application. The predefined user interface component is defined by an application development platform for a mobile device. A markup language user interface component is also displayed in the graphical user interface for the application.

Implementations can include one or more of the following features. The predefined user interface component defined by the application development platform comprises a mobile information device profile (MIDP) user interface component. User input is received based on a user interaction with the predefined user interface component and/or the markup language user interface component. The markup language user interface component is generated using an application programming interface for rendering the markup language user interface component.

In another general aspect, an application is provided for a handheld mobile device. The application includes instructions for generating a markup language code defining a first graphical user interface component for display on the handheld mobile device. A library containing a second graphical user interface component for display on the handheld mobile device is also provided. The second graphical user interface component is defined using a markup language, and the library is accessible by the application using an application programming interface.

Implementations can include one or more of the following features. The instructions generate different markup language codes in response to different user selections. The library is associated with the application and is stored on the handheld mobile device. The library is located remotely and is accessed using a wireless interface. A graphical user interface including the first graphical user interface component and the second graphical user interface component is generated on the handheld mobile device using a markup language renderer. The application or the library includes markup language fragments used by the instructions in combination with markup language code segments produced by the instructions to generate the markup language code. The application communicates with a remote server using a wireless interface. Mobile information device profile (MIDP) user interface components are also provided for use by the application.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Figure 1:
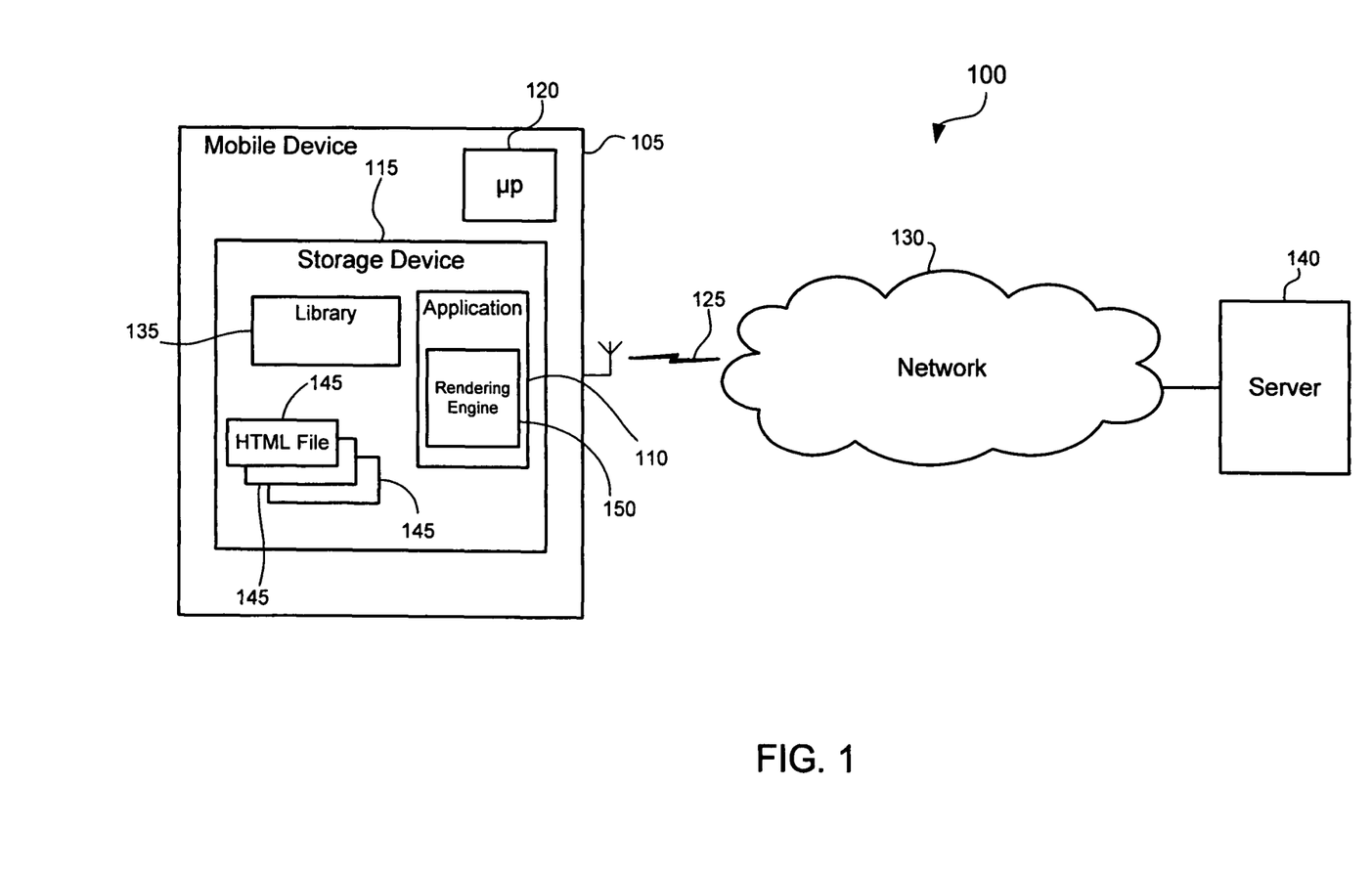
FIG. 1 is a block diagram of a system for retrieving data to a handheld mobile device.
Figure 2A:
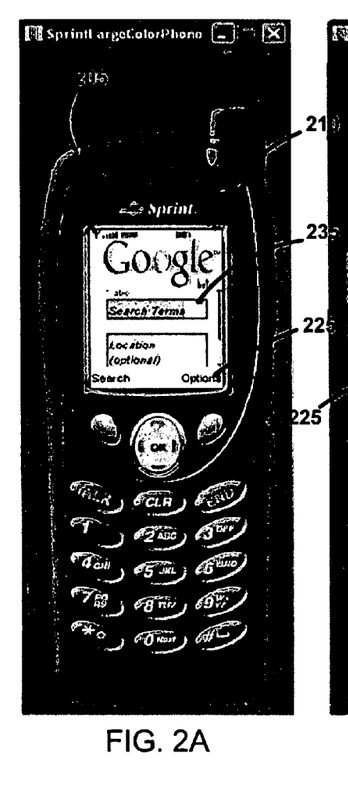
FIGS. 2A-2E illustrate a handheld mobile device that includes a graphical user interface for a search application.
Figure 2B:
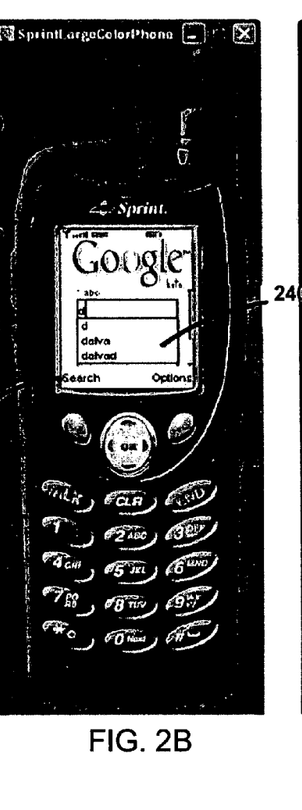
Figure 2C:
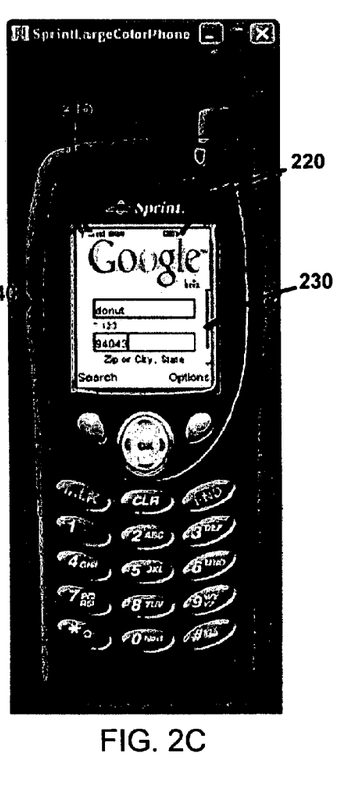
Figure 2D:
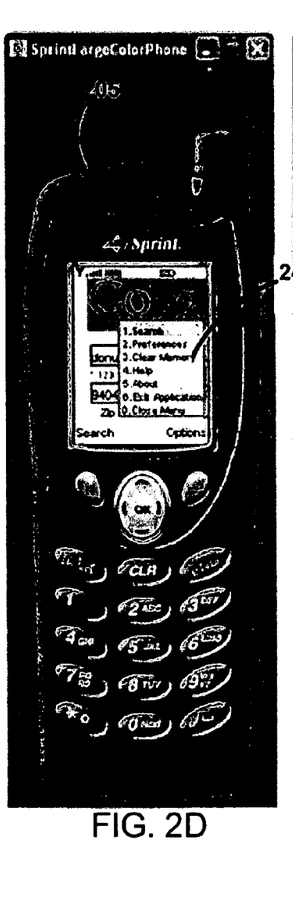
Figure 2E:
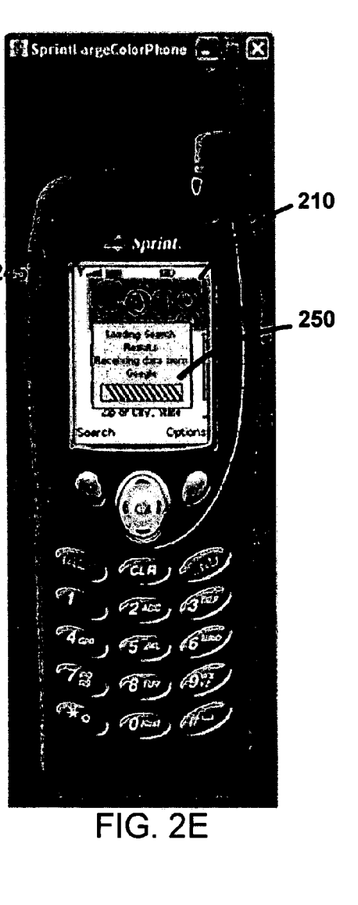

FIG. 1 is a block diagram of a system 100 for retrieving data to a handheld mobile device 105. The mobile device 105 can be a cellular telephone, a PDA, or another type of handheld wireless communications device. The mobile device 105 is capable of executing one or more software applications, displaying information to a user, and receiving user input. The mobile device 105 includes one or more applications 110, such as a search application or an application for accessing a web-based electronic mail account, that is specially designed for use on mobile devices. The application 110 is stored in a storage device 115 within the mobile device 105 and executes on a processor 120.

The mobile device 105 operates to conduct wireless communications using a cellular, satellite, or other radio communication link 125 with other devices or servers 140 over a network 130. The network 130 can include, for example, a public land mobile network, a public switched telephone network, a local area network, a wide area network, and/or any other type of telecommunication network. In some implementations, the mobile device 105 sends requests for data and performs other operations in accordance with instructions from the application 110. Thus, the application is "network aware" in that it connects to servers or other remote devices to store and/or retrieve data. In other implementations, the mobile device 105 performs processing operations in accordance with instructions from the application 110 using locally stored data or data received from a user of the mobile device 105 without relying upon data retrieved from a remote location.

The application 110 generates graphical user interfaces (e.g., pages or views) for presenting information to a user and/or for collecting information from a user. In some implementations, the graphical user interfaces may include some of the features typically found on web pages that are used for retrieving data. For example, if the application 110 is a search application, the graphical user interface displayed by the application 110 can include one or more data entry fields for a user to define a search query or other search parameters, similar to a typical search engine website. For displaying search results, the graphical user interface displayed by the application 110 can include a listing of search results, one or more data entry fields for a user to refine a search query or start a new search, and/or other features, such as links to other pages of the search results. If the application 110 is an electronic mail application, the graphical user interface displayed by the application 110 can include different mailboxes, such as an inbox, a mailbox for sent messages, and a mailbox for deleted messages. For each mailbox, the application 110 can display a list or partial list of messages. Any other type of graphical user interface appropriate for the functionality of the particular application 110 can also be generated and displayed.

Conventional applications for mobile devices rely upon a limited set of graphical user interface widgets or components for user interaction. For purposes of the following description, a widget is generally a component of a graphical user interface that displays information or that provides a way for a user to interact with a mobile device, an operating system, and/or an application. Widgets can include icons, pull-down menus, buttons, selection boxes, progress indicators, on-off checkmarks, scroll bars, windows, window edges (e.g., that let users resize the window), toggle buttons, forms, help pages or windows, tables, formatted lists, and other components for displaying information or for soliciting, accepting, and/or responding to user actions.

In general, software development for mobile devices is constrained by the wide variety of mobile device operating systems and hardware and by the limited resources of mobile devices, including, for example, limited memory, processing power and speed, network bandwidth and latency, screen size, and color depth. As a result, development of applications that use a graphical user interface to interact with a user is relatively difficult, particularly if there is a desire to make an application have a consistent look on a wide range of devices.

Many mobile devices include Java 2 Platform, Micro Edition, (J2ME) or Binary Runtime Environment for Wireless (BREW), which provide an application development platform that runs in between an application and a mobile device's operating system. J2ME includes Mobile Information Device Profile (MIDP), which is defined using JAVA code and provides a limited graphical user interface toolkit. The MIDP graphical user interface toolkit is relatively simplistic and allows for very minimal interaction with a user. MIDP widgets generally lack adaptability and the ability to customize their appearance and/or other characteristics because they are designed to have common functionality across multiple different devices and are constrained by the need to meet a "common denominator." In addition, a limited set of MIDP widgets does not always offer a software developer a sufficient set of tools from which to implement desired functionality.

To complement (or replace) the capabilities of J2ME or BREW and/or the native operating system, the mobile device 105 includes hypertext markup language (HTML) widgets in addition to the native widgets and any available MIDP widgets. Accordingly, an application 110 can use a combination of these different types of widgets. Thus, an application written in JAVA code can access some widgets (e.g., MIDP widgets) using a JAVA application program interface and can access HTML widgets by rendering HTML code to generate display components, to query a user of the application to enter data values, and/or to generate other graphical user interface components. In some implementations, widgets can be defined by other types of markup language code instead of or in addition to using HTML.

The content, appearance, and layout of an HTML widget is defined using HTML text. As shown in FIG. 1, the mobile device 105 includes a library 135 containing a set of application program interfaces that support the display of HTML constructs (e.g., widgets and/or pages) on the mobile device 105. In some implementations, the library 135 is included as part of or as a utility for an application 110. Accordingly, the library 135 can be unique to a particular application 110. In other implementations, the library 135 can be stored on the mobile device for sharing among multiple applications 110. As another option, the library 135 can be located remotely and can be accessed through the network 130.

The library 135 allows a programmer to include a uniform resource locator (URL) in an application and, when a call is made to the URL, an application program interface in the library 135 enables elements and/or data to be rendered on the mobile device 105 using information stored locally in the storage device 115 of the mobile device 105. The library 135 also allows HTML constructs to be dynamically created directly from the programming language for the application 110.

The application program interfaces can be structured in a variety of ways. For example, an application 110 can include a call to an application program interface that interprets a string literal defining an HTML tag (e.g., "<table>", "<tr>", or "<b>") to generate particular HTML components (e.g., insert a table, add a table row, or insert a bulleted list). As another example, an application 110 can include an application program interface that enables structured HTML components to be created using more descriptive tags (e.g., addTable( ), addRow( ) or createBulletedList( )). Using the application program interfaces, application programmers can create graphical user interfaces that are customized specifically for the application and/or situation (e.g., using widgets that are capable of displaying text) and that provide a more intuitive experience for end users.

An HTML text file that defines an HTML widget can come from one or more sources. One possible source is a predefined HTML file 145 that is included with the application 110 and locally stored in the storage device 115 (e.g., in the library 135, as part of the application 110, or in a distinct database). The predefined HTML file 145 can then be loaded by the application code for use in producing the HTML widget. A predefined HTML file 145 can be used, for example, for widgets having content that does not change or does not need to change frequently, such as help screens or menus.

The HTML text file that defines an HTML widget can also be dynamically generated (e.g., at runtime) by the application code. Thus, the application code can include instructions for producing an HTML text file that can then be rendered to produce the HTML widget. By dynamically creating the HTML text file, the graphical user interface that is produced and displayed can be adapted or tailored based on user settings, selections, profile data, responses, preferences, or other input. For example, a graphical user interface may include fewer options and/or detail for a beginner user than for an advanced user. In addition, the graphical user interface can be customized based on different user selections or activities. In some cases, the HTML text file can be generated from a mixture of predefined HTML text and dynamically generated HTML text. For example, predefined HTML files 145 can include fragments of HTML text that can be incorporated into dynamically generated HTML content to produce the HTML text file that defines an HTML widget.

The HTML widgets are generated by rendering HTML text using a markup language rendering engine 150 built into the application 110 or included in the mobile device 105. In some implementations, the markup language rendering engine 150 is integrated into and included as part of the application 110 in a single executable software application (e.g., the markup language rendering engine 150 is compiled together with other modules of the application 110). In other implementations, the markup language rendering engine 150 can be shared among different applications 110 by being a separate module stored in the mobile device 105. The markup language rendering engine 150 can operate in accordance with hypertext markup language (HTML), extensible hypertext markup language (XHTML), wireless markup language (WML), compact hypertext markup language (CHTML), and/or any other markup language.

Unlike conventional applications that render markup language code, which typically launch a separate, default browser application to render markup language text, the application 110 does not necessarily use an inter-application program call to launch or otherwise access the functionalities of a separate browser application. As a result, the application 110 can avoid the potential for an unsatisfactory user experience that can result from the delays generally inherent in activating a separate browser application to perform rendering. In some implementations, data rendered by the markup language rendering engine 150 and/or presented on a display can be formatted in a customized or partially customized manner (e.g., determining where to cut off lines of text, determining a size and/or resolution of images, and determining a number of lines in a snippet) based on one or more characteristics of the mobile device 105 (e.g., font metrics, screen width, amount of memory available, and screen height).

Among other things, the described techniques enable software developers for handheld mobile devices to create applications that have a uniform look and feel across a wide variety of devices. In addition, the use of HTML widgets helps increase portability of applications by limiting the conditional code needed to write portable applications.

FIGS. 2A-2E illustrate a handheld mobile device 205 that includes a graphical user interface 210 for a search application. The graphical user interface 210 includes widgets 215, 220, 225, 230, 235, 240, 245, and 250, some of which can be native widgets defined by an operating system of the mobile device 205, some of which can be MIDP widgets, and some of which can be HTML widgets. For example, native widgets can include a signal strength widget 215 and a battery level widget 220, and MIDP widgets can include text fields 225 and a scroll bar 230. The HTML widgets can include a text entry field 235, a drop-down menu 240 that includes text suggestions based on prior entries in the text entry field 235, a pop-up options menu 245, and a progress window 250.

Some of the HTML widgets, such as the progress window 250, can be defined by a static HTML file stored on the mobile device 205. Other HTML widgets, such as the drop-down menu 240 that includes text suggestions, can be defined by an HTML file dynamically generated by instructions included in the search application software. Still other HTML widgets, such as the pop-up options menu 245, can be defined by an HTML file that is partially dynamically generated and partially generated using HTML fragments. For instance, the listed options can be dynamically generated based on user preferences relating to most-used options or experience level, while the appearance and/or structure of the pop-up menu 245 can be defined by static HTML fragments. Accordingly, the search application software can generate an HTML file by incorporating HTML fragments stored on a storage device 115 of the mobile device 205 into appropriate locations of dynamically generated HTML text and/or by dynamically inserting HTML text into placeholder locations (e.g., blanks) in a static HTML file.

Figure 3:
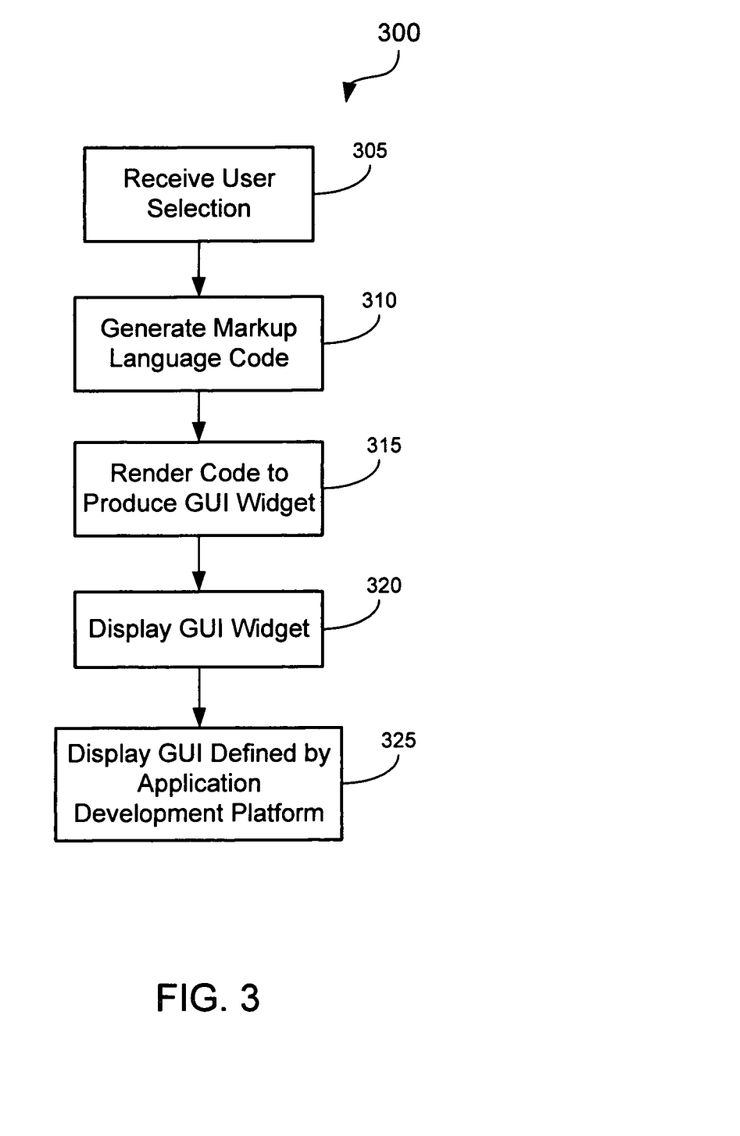
FIG. 3 is a flow diagram of a process for producing a graphical user interface.

FIG. 3 is a flow diagram of a process 300 for producing a graphical user interface. A user selection of one or more options is received (305). The user selection can be received on a handheld mobile device through a user interface such as a touch screen, a keypad, or using a voice recognition feature. The user selection can include a selection of an option or setting or an entry of information in an application running on the mobile device. For example, the user selection can include a selection between providing simplistic or advanced features.

A markup language code is dynamically generated in accordance with the user selection (310). The markup language code defines a graphical user interface widget for display on a handheld mobile device. For example, the markup language code is generated by a software application loaded onto the mobile device. The markup language code is generated such that, when the markup language code is rendered, it produces a graphical user interface widget. The graphical user interface widget can have one or more adaptable attributes based on the selection made by the user. Thus, the selections made by the user can result in generating different markup language codes, each of which corresponds to a different appearance, set of functions, complexity, or set of other features of the graphical user interface widget.

The attributes that impact the features of the graphical user interface can relate, for example, to an amount of information displayed, a type or content of displayed information, or a number and/or type of available options and can include such features as size, color, shape, format, and text. Thus, depending on the user selection or selections, each attribute can have a different value or state. Depending on the value or state, the application generates different markup language text. For example, in a tax return application, if the user selects a more simplistic option, the application may generate a markup language code for displaying a series of data entry fields for entering information on a 1040EZ federal tax return form, while, if the user selects a more advanced option, the application may generate a markup language code for displaying a series of data entry fields for entering information on a standard 1040 federal tax return form and on one or more associated schedules.

The markup language code is rendered to produce the desired graphical user interface widget (315). The markup language code can be rendered by a markup language code rendering engine included in the application or otherwise stored on the mobile device. The rendered graphical user interface widget is displayed by the application on a display screen of the mobile device (320). In some cases, the application can also cause the mobile device to display on the display screen one or more graphical user interface components defined by an application development platform (325), such as JAVA, J2ME, or BREW. Thus, both rendered graphical user interface widgets and graphical user interface components can be used by the application (e.g., to receive user input based on a user interaction with the widgets or components) and, optionally, displayed on the same display screen.

Figure 4:
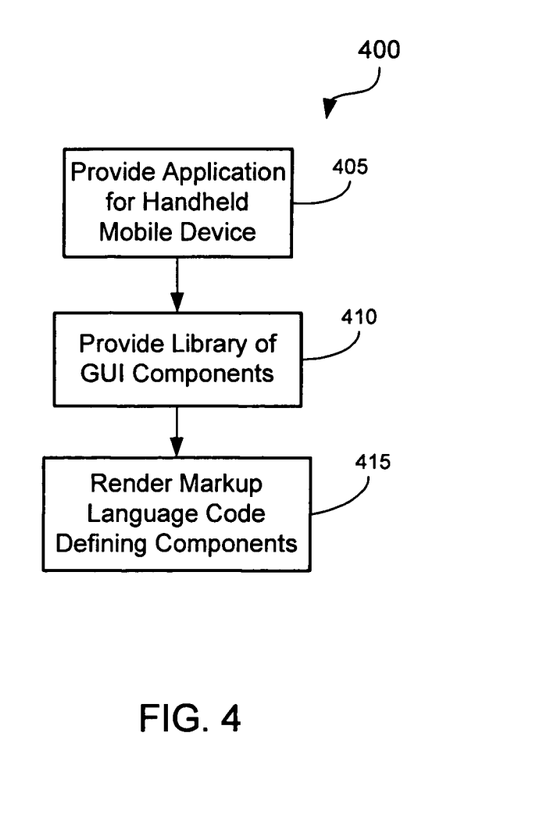
FIG. 4 is a flow diagram of an alternative process for producing a graphical user interface.

FIG. 4 is a flow diagram of an alternative process 400 for producing a graphical user interface. An application is provided for a handheld mobile device (405). The application can be written, for example, in JAVA, J2ME, or BREW. The application includes instructions for generating a markup language code defining graphical user interface components for display on the mobile device. In addition, a library that contains one or more graphical user interface components for display on the mobile device is provided (410). The graphical user interface components included in the library are defined using a markup language, and the library is accessible by the application using an application programming interface. In general, the library contains static markup language code for defining the components.

A graphical user interface that includes at least one component dynamically generated by the instructions and at least one component included in the library is generated by rendering (415) markup language code defining the components. In some cases, the dynamically generated components and the components included in the library can each define distinct widgets. Thus, a renderer separately renders the markup language code for a statically defined widget and the markup language code for a dynamically generated widget. In other cases, the components included in the library can include markup language code fragments that can be dynamically incorporated into other dynamically generated markup language code to produce a combined markup language code that defines a single graphical user interface widget. Thus, the application contains instructions for dynamically generating markup language code and combining markup language code fragments from the library to produce the combined markup language code, which is rendered by the renderer to produce the desired widget.

The systems and all of the functional operations described in this specification can be implemented in digital electronic circuitry, or in computer software, firmware, or hardware, including the structural means disclosed in this specification and structural equivalents thereof, or in combinations of them. The techniques can be implemented as one or more computer program products, i.e., one or more computer programs tangibly embodied in a machine readable storage device for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform the described functions by operating on input data and generating output. The processes and logic flows can also be performed by, and apparatus can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, the processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, aspects of the described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made. For example, operations of the logic flows depicted in FIGS. 3 and 4 can be performed in a different order than that shown and/or can be performed iteratively. Accordingly, other implementations are within the scope of the following claims.

What is claimed is:

1. An article comprising a non-transitory machine-readable medium storing instructions for causing data processing apparatus of a handheld mobile device to:
   receive a request to generate markup language code defining a graphical user interface component, wherein the request is generated by a particular application stored on a handheld mobile device, the request defining at least one parameter for the a graphical user interface component;
   generate a markup language code locally on the handheld mobile device for local rendering on the handheld mobile device based at least in part on the at least one parameter, the markup language code defining the graphical user interface component for display on the handheld mobile device to provide for user interaction with the particular application that generated the request, the graphical user interface component including at least one adaptable attribute based on a selection made by a user of the handheld mobile device; and
   render the locally generated markup language code to produce the graphical user interface component for display on the handheld mobile device.

2. The article of claim 1 wherein:
   the selection is made through an interaction with the particular application running on the handheld mobile device; and
   the graphical user interface component is displayed on the handheld mobile device using the particular application.

3. The article of claim 2 wherein the non-transitory machine-readable medium stores instructions for further causing data processing apparatus to retrieve a static markup language code from a file associated with the particular application.

4. The article of claim 3 wherein the non-transitory machine-readable medium stores instructions for further causing data processing apparatus to render the static markup language code to produce another graphical user interface component.

5. The article of claim 3 wherein the non-transitory machine-readable medium stores instructions for further causing data processing apparatus to combine the static markup language code with the locally generated markup language code to produce a combined markup language code, wherein the graphical user interface component is produced by rendering the combined markup language code.

6. The article of claim 1 wherein the at least one adaptable attribute is selected from the group consisting of a size, a color, a shape, a format, and a text.

7. The article of claim 1 wherein the non-transitory machine-readable medium stores instructions for further causing data processing apparatus to display a graphical user interface component defined by an application development platform on the handheld mobile device.

8. The article of claim 1, wherein the locally generated markup language code includes hypertext markup language code.

9. The article of claim 1, wherein generating a markup language code locally on the handheld mobile device includes:
   dynamically generating hypertext markup language code segments; and
   incorporating hypertext markup language code fragments stored on the handheld mobile device into the dynamically generated hypertext markup language code segments.

10. A system comprising:
    a memory of a handheld mobile device adapted to store:
        a particular application including instructions for sending a request to generate markup language code defining a graphical user interface component, the request including an identification of a state of at least one variable; and
        markup language code generated locally on the handheld mobile device based at least in part on the state of the at least one variable, the markup language code for use by the particular application stored on the handheld mobile device; and
    a rendering engine configured to render the locally generated markup language code to produce a graphical user interface component for display on the handheld mobile device by the particular application, the graphical user interface component providing for a user interaction with the particular application.

11. The system of claim 10 wherein the memory is adapted to store a file associated with the particular application, the file comprising the markup language code.

12. An article comprising a non-transitory machine-readable medium storing instructions for causing data processing apparatus of a handheld mobile device to:
    display on the handheld mobile device a predefined user interface component in a graphical user interface for a particular application of the handheld mobile device, wherein the predefined user interface component is defined by an application development platform of the handheld mobile device;
    generate markup language code defining a markup language user interface component locally on the handheld mobile device based at least in part on at least one parameter defined in a request from the particular application of a handheld mobile device;
    produce the markup language user interface component by rendering the generated markup language code; and
    display on the handheld mobile device the produced markup language user interface component in the graphical user interface for the particular application of the handheld mobile device, the markup language user interface providing for user interaction with the particular application.

13. The article of claim 12 wherein the predefined user interface component defined by the application development platform comprises a mobile information device profile (MIDP) user interface component.

14. The article of claim 12 wherein the non-transitory machine-readable medium stores instructions for further causing data processing apparatus to receive user input based on a user interaction with at least one of the predefined user interface component or the markup language user interface component.

15. The article of claim 12 wherein rendering the generated markup language code comprises using an application programming interface to render the markup language code.

16. A method comprising:
    providing a particular application for a handheld mobile device, wherein the particular application includes instructions for generating and rendering a markup language code locally on the handheld mobile device, the markup language code defining a first graphical user interface component for display by the particular application on the handheld mobile device, the first graphical user interface component providing for user interaction with the particular application; and
    providing a library containing a second graphical user interface component for display on the handheld mobile device, the second graphical user interface component defined using a markup language and the library accessible by the particular application using an application programming interface.

17. The method of claim 16 wherein the instructions generate different markup language codes in response to different user selections.

18. The method of claim 16 wherein the library is associated with the particular application and is stored on the handheld mobile device.

19. The method of claim 16 wherein the library is located remotely and is accessed using a wireless interface.

20. The method of claim 16 further comprising producing a graphical user interface including the first graphical user interface component and the second graphical user interface component on the handheld mobile device using a markup language renderer.

21. The method of claim 16 wherein at least one of the particular application or the library include markup language fragments used by the instructions in combination with markup language code segments produced by the instructions for generating the markup language code.

22. The method of claim 16 wherein the particular application communicates with a remote server using a wireless interface.

23. The method of claim 16 further comprising providing mobile information device profile (MIDP) user interface components for use by the particular application.

* * * * *

UNITED STATES PATENT AND TRADEMARK OFFICE
CERTIFICATE OF CORRECTION

| | | |
|---|---|---|
| PATENT NO. | : 8,694,925 B1 | Page 1 of 1 |
| APPLICATION NO. | : 11/243916 | |
| DATED | : April 8, 2014 | |
| INVENTOR(S) | : Cedric Beust et al. | |

It is certified that error appears in the above-identified patent and that said Letters Patent is hereby corrected as shown below:

In the Claims:

Column 9, line 25, Claim 1, please delete "the a" and insert therefor -- the --.

Signed and Sealed this
Eighth Day of July, 2014

Michelle K. Lee
*Deputy Director of the United States Patent and Trademark Office*

UNITED STATES PATENT AND TRADEMARK OFFICE
CERTIFICATE OF CORRECTION

| | |
|---|---|
| PATENT NO. | : 8,694,925 B1 |
| APPLICATION NO. | : 11/243916 |
| DATED | : April 8, 2014 |
| INVENTOR(S) | : Beust et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1643 days.

Signed and Sealed this
Eleventh Day of August, 2015

Michelle K. Lee
*Director of the United States Patent and Trademark Office*